United States Patent
Götz

(10) Patent No.: US 11,038,435 B2
(45) Date of Patent: *Jun. 15, 2021

(54) CONVERTER, ELECTRICAL POLYPHASE SYSTEM AND METHOD FOR EFFICIENT POWER EXCHANGE

(71) Applicant: Dr. Ing. h.c. F. Porsche Aktiengesellschaft, Stuttgart (DE)

(72) Inventor: Stefan Götz, Forstern (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 441 days.

This patent is subject to a terminal disclaimer.

(21) Appl. No.: 16/159,834

(22) Filed: Oct. 15, 2018

(65) Prior Publication Data

US 2019/0115849 A1    Apr. 18, 2019

(30) Foreign Application Priority Data

Oct. 17, 2017   (DE) .......................... 102017124126.4

(51) Int. Cl.
*H02M 7/483*       (2007.01)
*H02P 27/14*       (2006.01)
(Continued)

(52) U.S. Cl.
CPC ............ *H02M 7/483* (2013.01); *B60L 53/20* (2019.02); *H02K 3/28* (2013.01); *H02K 11/33* (2016.01);
(Continued)

(58) Field of Classification Search
CPC .... H02P 5/74; H02P 5/45; H02P 27/14; B60L 2220/42; B60L 2220/58; B60L 50/60;
(Continued)

(56) References Cited

U.S. PATENT DOCUMENTS 6,075,350 A    6/2000  Peng
6,449,181 B1   9/2002  Rieger et al.
(Continued)

FOREIGN PATENT DOCUMENTS

DE    10103031 A1    7/2002
DE    10217889 A1    11/2003
(Continued)

OTHER PUBLICATIONS

German Examination Report for German Application No. 10 2017 124 126.4, dated Nov. 15, 2018—5 pages
(Continued)

*Primary Examiner* — Bryan R Perez
(74) *Attorney, Agent, or Firm* — RatnerPrestia

(57) ABSTRACT

A modular multi-level converter including modules each having switching elements and at least one electrical energy storage element, wherein a first number of modules are interconnected to form a closed ring, and at least two taps are arranged between respective adjacent individual modules of the closed ring. Wherein at at least two taps respectively a second number of modules are provided as a phase module branching off from the closed ring and forming a star string comprising at least two modules, the phase module connected to the respective tap on one end and forming a phase terminal at an other end. Wherein the switching elements enable interconnection of energy storage elements of adjacent modules, as a result of which between two adjacent phase terminals a voltage difference is provideable, which is regulatable by a control unit in accordance with a polyphase rotating field profile. Furthermore, the present invention relates to a polyphase system and a method for efficient power exchange between modules.

17 Claims, 6 Drawing Sheets

(51) Int. Cl.
  *H02P 25/22* (2006.01)
  *B60L 53/20* (2019.01)
  *H02M 7/48* (2007.01)
  *H02K 11/33* (2016.01)
  *H02K 3/28* (2006.01)
  *H02M 7/00* (2006.01)
  *H02M 7/537* (2006.01)
  *H02P 27/06* (2006.01)

(52) U.S. Cl.
  CPC ......... *H02M 7/003* (2013.01); *H02M 7/4826* (2013.01); *H02M 7/537* (2013.01); *H02P 25/22* (2013.01); *H02P 27/14* (2013.01); *H02J 2207/20* (2020.01); *H02M 2007/4835* (2013.01); *H02P 27/06* (2013.01)

(58) Field of Classification Search
  CPC ...... B60L 58/19; B60L 58/22; B60Y 2400/60; B60Y 2200/91; Y02T 10/70; Y02T 10/92; Y02T 10/7072; Y02T 10/64; Y02T 10/72; H02M 7/483; H02M 7/4826; H02M 7/003; H02M 7/537; H02M 5/22; H02M 5/42; H02J 7/0021; H02J 7/0024; H02J 7/0019
  See application file for complete search history.

(56) References Cited

U.S. PATENT DOCUMENTS

| | | | |
|---|---|---|---|
| 6,657,334 | B1 | 12/2003 | Edelson |
| 7,269,037 | B2 | 9/2007 | Marquardt |
| 9,496,799 | B2 | 11/2016 | Goetz et al. |
| 10,454,331 | B2 * | 10/2019 | Gotz ................... H02K 3/28 |
| 2004/0104700 | A1 | 6/2004 | Edelson |
| 2007/0109823 | A1 | 5/2007 | Rastogi et al. |
| 2014/0049230 | A1 | 2/2014 | Weyh |
| 2014/0146586 | A1 | 5/2014 | Das et al. |
| 2014/0167709 | A1 * | 6/2014 | Baruschka ............ H02M 5/22 323/217 |
| 2014/0218986 | A1 | 8/2014 | Hasler et al. |
| 2015/0077069 | A2 | 3/2015 | Weyh et al. |
| 2015/0124506 | A1 | 5/2015 | Sahoo et al. |
| 2015/0188447 | A1 | 7/2015 | Jimichi et al. |
| 2015/0288287 | A1 | 10/2015 | Madawala et al. |
| 2016/0020628 | A1 | 1/2016 | Guo et al. |
| 2016/0105020 | A1 | 4/2016 | Guo et al. |
| 2017/0163115 | A1 | 6/2017 | Götz |

FOREIGN PATENT DOCUMENTS

| | | |
|---|---|---|
| DE | 102010052934 A1 | 5/2012 |
| DE | 102011107737 A1 | 1/2013 |
| DE | 102011108920 A1 | 1/2013 |
| DE | 102014110410 A1 | 1/2016 |
| DE | 102015112512 A1 | 2/2017 |
| DE | 102015121226 A1 | 6/2017 |
| WO | 2012072168 A2 | 6/2012 |
| WO | 2016119820 A1 | 8/2016 |

OTHER PUBLICATIONS

German Examination Report for German Application No. 10 2017 124 126.4, dated Jul. 12, 2018, with partial translation—5 pages.
Goetz et al., "Modular Multilevel Converter with Series and Parallel Module Connectivity: Topology and Control", IEEE Transactions on Power Electronics, vol. 30, No. 1, Jan. 2015, pp. 203-215.
Lesnicar et al., "An Innovative Modular Multilevel Converter Topology Suitable for a Wide Power Range", Power Tech Conference Proceedings, 2003, pp. 1-6.
Indian Examination Report for Indian Application No. 201614038954, dated Feb. 5, 2019 with translatiojn, 5 pages.
Chinese Office Action for Chinese Application No. 201611101758X dated Jul. 18, 2018, 7 pages.
German Search Report for German Application No. 10 2015 121 226.9, dated Jul. 7, 2017, 8 pages.

* cited by examiner

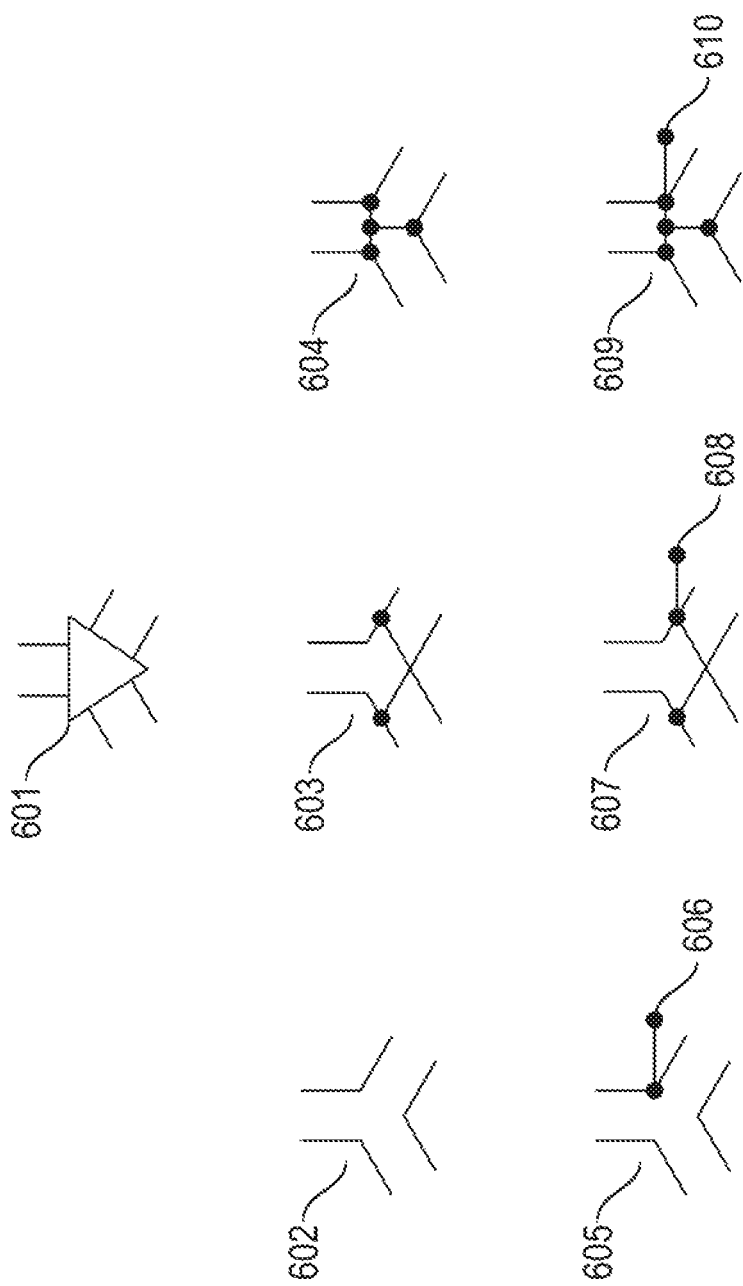

US 11,038,435 B2

CONVERTER, ELECTRICAL POLYPHASE SYSTEM AND METHOD FOR EFFICIENT POWER EXCHANGE

CROSS-REFERENCE TO RELATED APPLICATION

This application claims priority to German Patent Application No. DE 10 2017 124 126.4, filed Oct. 17, 2017, which is incorporated by reference herein in its entirety.

FIELD OF THE INVENTION

The invention relates to a modular multi-level converter, an electrical polyphase system and a method for efficient power exchange during the operation of an electrical polyphase system.

BACKGROUND OF THE INVENTION

Conventional batteries can be hardwired units composed of individual parts, e.g. individual cells or partial batteries. Batteries of this type substantially provide a DC voltage at an output. Many consumers, by contrast, require e.g. an AC voltage having a specific frequency, amplitude and/or phase. Furthermore, the DC voltage is not constant with the state of charge. In order to operate the consumers connected to the battery both at a peak voltage and at an end-of-charge voltage and to be able to draw the required power, the consumers have to have complex supply circuits.

As an alternative thereto, in order to provide an output voltage required by a consumer, a converter is provided which allows a dynamic switchover of an interconnection of a corresponding battery, wherein switching elements are switched over such that energy storage elements of the battery are present either in parallel connection and/or in series connection. Such a battery is referred to as a switched battery. In contrast to previous converters, in this case a modulation index to be provided, i.e. a characteristic value of a corresponding frequency modulation, can be kept at a maximum at all amplitudes. Furthermore, the losses decrease at low voltages because an effective internal resistance decreases as a result of a parallel connection of the battery parts of a switched battery. Furthermore, a switched battery in which the energy storage elements can be switched back and forth between a parallel connection and a series connection generates an output voltage that is almost free of distortion since steps between the voltages of two configurations can be kept very small. Moreover, modulation can be effected by switching modulation between such voltages in order to provide further smoothing.

Electrical converters, a subtype of electrical power converters, convert DC voltage into AC voltage. Topologies for electrical converters are known e.g. from DE 10 2010 052 934 A1, DE 10 2011 108 920 B4, DE 102 17 889, U.S. Pat. No. 7,269,037, DE 101 03 031, and DE 10 2015 112 512 A1, which are all incorporated by reference herein.

DE 10 2010 052 934 A1 describes an electrical converter system comprising at least two cascade-connected individual modules of identical type. The individual modules have at least four internal switching elements, at least one energy storage element and at least four terminals, of which respectively two of the terminals form a first and a second terminal pair. The internal switching elements of each individual module are embodied such that they can optionally connect one or both terminals of each terminal pair to the energy storage element. Switching elements of the respective individual modules in the cascade connection of the at least two individual modules connect their respective energy storage elements to the terminals of the cascade connection such that optionally a series connection or a parallel connection of the energy storage elements is present.

DE 10 2011 108 920 B4 continues this approach and likewise describes an electrical converter system comprising at least two cascade-connected modules of identical type, wherein the cascade-connected modules form a bridge branch. The modules have at least one module capacitor and switching elements. An intermediate module is connected at least between one module and a downstream module of the cascade-connecting modules, said intermediate module having at least one inductance for energy storage.

DE 10 2015 112 512 A1 describes a battery module whose electrical interconnection is dynamically variable, i.e. the individual battery cells are not wired to one another in a fixed manner. To that end, provision is made for using battery parts of identical type, each comprising one or more battery cells and a plurality of low-voltage switches, in particular MOSFETs. The individual battery cells can thus be switched over between a parallel connection, a series connection, a bridging and a shutdown of individual or a plurality of battery parts. Since all the low-voltage switches which are required for switching over the electrical connection between battery parts are situated in the same battery part, no special voltage supplies are necessary, and it is possible to ensure an accurate timing, i.e. a simultaneity of the driving.

Examples of power electronic circuits are the modular multi-level converter M2C, as described in U.S. Pat. No. 7,269,037 and DE 101 03 031 cited above, or the modular multi-level parallel-serial converter M2SPC, as described, e.g. in DE 10 2010 052 934 and DE 10 2011 108 920. The circuit concept of such modular multi-level converters, both M2C or MMC and M2SPC or MMSPC, is usually classified into a microtopology, i.e. an interconnection within the module, and a macrotopology, i.e. a combination of a plurality of modules to form a system, such as e.g. of a converter. Generally, a modular multi-level converter M2C or MMC comprising an electrical series connection of the electrical energy storage elements of the modules that said converter comprises allows the individual electrical energy storage elements to be switched over dynamically between active operation in the series connection and withdrawal from the series connection by means of a bypass of the current. MMC topologies are described e.g. in US 2015/0288287 A1, US 2016/0020628 A1 and US 2016/0105020 A1, which are all incorporated by reference herein. The multi-level converter M2SPC or MMSPC provides both a parallel state and a serial state for the individual electrical energy storage elements of the modules that said converter comprises.

While a multiplicity of module types having different switching states and functionalities have become known in the meantime, the known macrotopologies are restricted to a few known module combinations.

Known macrotopologies comprise a module string, for example, which is usable only for single-phase systems, however, provided that energy drawing and energy feedback compensate for one another over time or can be compensated for e.g. by interim charging. Examples thereof are combination systems for power supply, e.g. STATCOM, or single-phase AC battery sources. Furthermore, a pulse topology for generating highly dynamic current pulses with separate connection terminals with respect to the charging connection terminals is known, as described e.g. in Götz, S.

M.; Peterchev, A. V.; Weyh, T., "Modular Multilevel Converter with Series and Parallel Module Connectivity: Topology and Control", Power Electronics, IEEE, Transactions on, vol. 30, no. 1, pp. 203, 215, 2015. doi: 10.1109/TPEL.2014.2310225, which is incorporated by reference herein. Furthermore, a so-called Marquardt topology for bidirectional AC/AC and AC/DC systems is known, as described e.g. in Lesnicar, A.; Marquardt, R., "An innovative modular multilevel converter topology suitable for a wide power range", Power Tech Conference Proceedings, 2003 IEEE Bologna, vol. 3, no., pp. 6, pp. vol. 3, 23-26, 2003, doi: 10.1109/PTC.2003.1304403, which is incorporated by reference herein.

However, hitherto no systematic rule has been known regarding what properties a macrotopology must fulfill in order that a converter arising as a result of the interconnection of the individual modules is functional. Generally, in a macrotopology, different modules can also be combined if they can each represent at least two mutually compatible states, such that a switchover between different switching states is possible.

Modular multi-level converters, in particular a traditional MMC and a traditional MMSPC, operate according to the scheme that, in contrast to traditional power electronic systems employing a small number of power switches to switch over input or output voltages between a small number of levels in order to obtain a desired variable on average, a voltage is controlled in very fine steps by a dynamically changeable electrical configuration of charged energy storage elements arranged in modules, such as e.g. capacitors or batteries, with electrical or electronic switches situated in the modules and with specific states.

As already explained above, modular multi-level converters generally consist of two constituents, a module type, the so-called microtopology, and an interconnection of modules, the so-called macrotopology. The macrotopology, in particular, is considered in the context of the present disclosure, wherein the concept according to aspects of the invention can be applied to all module types.

In general, MMSPC modules differ from conventional MMC modules in that an additional parallel state exists. This means that an MMSPC in a string can generate a virtually arbitrary electrical serial-parallel circuit configuration of module-integrated energy storage elements and dynamically change it. Furthermore, a bypass state or bypass is usually available too, in order to bypass the energy storage element of a module. An occasional series interconnection of the module-integrated energy storage elements in only one polarity or both polarities can be made possible depending on the module type.

Generally, the principle of a modular multi-level converter is based on a generation of voltage differences between two terminals or terminal points e.g. of an energy network by means of a configuration of an electrical interconnection of energy storage elements in the modules and a switching modulation between switching states in order to form arbitrary intermediate states. If e.g. between two terminal points the modules generate a voltage slightly lower than that of the terminal points themselves, current and thus charge flows into the respective energy storage elements of the modules. If by contrast more modules are connected in series, current flows from the energy storage elements of said modules into the terminals. In this case, through suitable selection of the switching states of each module, the controller can decide from which module a respective energy storage element comprised therein is drained, filled or not influenced at all in the case of current flowing into an arm of a multi-level converter, said arm comprising a plurality of modules. During the operation of a modular multi-level converter, what is desired is to keep all the energy storage elements similarly charged or at least to prevent individual modules or the energy storage elements thereof from being over- or undercharged.

This results in a first charge balancing mechanism. A respective energy content of the respective energy storage elements of the plurality of modules can be monitored and influenced by modules deliberately being connected into a current flow in charging fashion, in a manner comparable with a bucket that is held in a flow of water, or being connected into a current flow in discharging fashion, in a manner comparable with a bucket that is additionally added to a jet of water already flowing. By measuring or estimating a state of charge or a voltage of each energy storage element of the plurality of modules, a balancing intervention can accordingly be made by a controller.

In this way, charge and energy can furthermore be transferred from one module to another module, e.g. by one module being positively connected in series and another negatively connected in series, or, in the case of AC current, one of the modules preferably being connected such that it is used, i.e. in series, during the positive half-cycle, but in the negative half-cycle being connected preferably or for a relatively long time in bypass operation or the like, while the other module is to be connected exactly oppositely in relation to the first module. In a closed ring of modules it is possible to generate a circulating ring current which likewise enables charge exchange without an external load current.

In modular multi-level converters having the possibility of parallel connection of modules, such as e.g. in the MMSPC mentioned above, a second process of charge and energy transfer can furthermore be utilized by two or more modules that have a slightly differently charged energy storage elements being occasionally connected in parallel. The balancing currents from the fuller to the more empty energy storage element correspondingly balance charge, voltage and/or energy.

In the case of AC voltage generation with a modular multi-level converter, an AC voltage is generated by corresponding coordination of the modules at every point in time. The AC voltage along e.g. a string or arm of the multi-level converter is correspondingly substantially sinusoidal and includes the negative half-cycles. In the case of active power output of the multi-level converter or else only of the corresponding arm, the current follows the voltage without a phase offset. Consequently, the electrical power as the product of current and voltage is approximately proportional to $\sin^2(\omega t) \geq 0$. Since the module configuration, i.e. the switching configuration of the modules, follows the voltage, the energy storage elements of the respective modules are always subjected to polarity reversal by the electronic switches, such that the energy flow is positive. On account of this polarity reversal, the current at least from the viewpoint of the energy storage elements of the respective modules appears to have a $|\sin(\omega t)|$ component. That means that the current is not constant over time. This applies approximately to all modules of a string that is subjected to the same total voltage and the same current. On account of that, balancing between neighbors by means of suitable scheduling or by means of a suitable switching coordination of the module states or of the switching states of the modules of a string is not possible.

This current ripple that thus arises has disadvantages in a number of regards. Firstly, many loss mechanisms in the modules are approximately nonlinear, e.g. proportional to the square of the current in accordance with ohmic losses. Consequently, losses of a pulsating current, as mentioned above, are higher than in the case of a constant current. Furthermore, the energy storage elements have to provide the charge for the balancing over time. On the one hand, some energy storage elements as a result are constantly charged and discharged, associated with corresponding aging and heating. On the other hand, the capacitance required for this has to be kept available in the module stores in addition to the capacitance that is actually necessary.

The technology of modular multi-level converters is intended to be used, in particular, to separate the hitherto hardwired battery packs briefly described in the introduction into partial batteries or modules such that the electrical interconnection of the individual parts can be varied dynamically during operation. Preferably, partial batteries can switch over between a parallel connection, a series connection, a bridging, i.e. of a bypass, and a shutdown of individual or a plurality of partial batteries, as described e.g. In Götz, S. M.; Peterchev, A. V.; Weyh, T., "Modular Multilevel Converter with Series and Parallel Module Connectivity: Topology and Control", Power Electronics, IEEE, Transactions on, vol. 30, no. 1, pp. 203, 215, 2015. doi: 10.1109/TPEL.2014.2310225, which is incorporated by reference herein, The dynamic reconfiguration of the interconnection of the battery parts or of the individual modules enables three functions to be combined. Firstly, charge exchange between the battery parts, in order to carry out conventional battery management, for example, is made possible. Secondly, defective battery parts can be bridged, without losing the overall function. Thirdly, arbitrary output voltages and temporary current and/or voltage profiles can be generated directly by the battery without the need for an additional power electronic converter.

In this case, all the switches can be low-voltage switches, e.g. MOSFETs, which means that a maximum voltage for which the respective switches have to be designed is significantly below the total voltage of the system, but rather e.g. at the maximum voltage of the battery part that the associated switches act on directly. In this case, battery parts can be individual cells, but also a plurality of cells, e.g. even a small battery pack. In the present disclosure, e.g. primary cells, secondary cells, capacitors of any type or energy sources or energy storage elements that use only DC voltage are deemed to be a battery.

By means of a dynamic reconfiguration of the battery interconnection, it is possible to generate directly the AC voltage and the multiphase voltage for one or more consumers. In contrast to previous converters it is possible, as already mentioned in the introduction, for a modulation index that is to be provided to be kept at a maximum at all amplitudes. Furthermore, the losses even decrease at low voltages because the effective internal resistance decreases as a result of a parallel connection of the battery parts. Moreover, such a switched battery generates an output voltage that is almost free of distortion since the steps between the voltages of two configurations can be kept very small. Moreover, modulation can be effected by switching modulation between such voltages in order to provide further smoothing. However, the multiphase voltage has to be generated in a manner that means no or only little extra outlay.

With the use of the modules mentioned in the introduction, the modules can be interconnected in various ways in order to generate different voltages. One possibility for generating polyphase voltages, e.g. three-phase or polyphase AC voltage, e.g. for the operation of a plurality of polyphase systems or generally for conversion between a plurality of electrical terminals consists in a star interconnection between strings or arms, each in turn consisting of individual modules. With the use of the MMSPC modules mentioned above, the modules can be interconnected in order to enable a parallel interconnection of modules across string boundaries at the star point if the respective at least two electrical terminals of each module string are interconnected in pairs. A parallel connection across strings allows an energy exchange between said strings or between the energy storage elements of the modules contained in the respective strings.

Besides a star connection, the modules can also be interconnected to form a ring or to form an n-gon configuration, wherein a current loading of the modules contained in the ring remains constant to a first approximation given identical drive power. At the same time, an average current intensity per phase of the electrical machine decreases inversely linearly with the number of phases provided. Respective consumers can be connected via terminals to be provided between in each case two modules within the ring, wherein the outlay for generating a respective phase proceeding from a three-way system, for example, consists merely in adding an additional tap at the ring connection of the modules.

One general problem is that energy can be exchanged between the modules or between energy storage elements of the modules only to a very limited extent, even though an occasionally different loading of the energy storage elements of the respective modules can be present during operation, particularly if different taps are used for respectively different drive machines. In a multi-machine configuration, for example, this concerns the routine case that the individual machines are operated at different operating points, but also that, on account of the AC voltage, the load of the modules can fluctuate with the frequency of the AC voltage or the harmonics thereof, in particular double the frequency of the AC voltage.

However, these fluctuations are not temporally synchronous on account of the temporal offset of the different phases and could therefore compensate for one another to give virtually constant load if a substantial efficient power exchange between modules of different taps or arms were possible.

SUMMARY OF THE INVENTION

Accordingly, it was an object of the present invention to provide a possibility for interconnecting the modules of a multi-level converter with one another in the underlying macrotopology such that a substantial efficient power exchange between the modules of different taps or arms of the converter is possible.

In order to achieve this object, a multi-level converter and a polyphase system and also a method having the features of the respective independent patent claims are provided.

Further advantages and configurations can be gathered from the description and the respective dependent claims.

What is proposed is a modular multi-level converter comprising a plurality of individual modules each having a plurality of switching elements and at least one electrical energy storage element, wherein a first number of individual modules are interconnected in succession to form a closed ring, and at least two taps are arranged in each case between two adjacent individual modules of the ring, wherein at least one individual module of the ring is arranged between two adjacent taps, said at least one individual module forming a ring segment, and wherein at at least two taps respectively a second number of individual modules are provided as phase module branching off from the ring arrangement and forming a star string and comprising at least two individual modules, said phase module being connected to the respective tap by one end and forming a phase terminal at the other end, wherein the plurality of switching elements enables interconnection of energy storage elements of adjacent individual modules, as a result of which between two adjacent phase terminals a voltage difference is provideable, which is regulatable by a first control unit in accordance with a profile of a polyphase rotating field, and as a result of which between energy storage elements of individual modules of the plurality of individual modules a power exchange is realizable and is controllable by a second control unit.

The first and second control units can be combined in a superordinate control unit.

In a configuration, it is possible to realize and control a power exchange between energy storage elements of modules belonging to different star strings and/or between energy storage elements of modules of a star string and modules of the ring arrangement and/or between energy storage elements of modules within the ring arrangement.

The invention proposes a topology in which advantages of a ring topology are combined with advantages of a star topology, such that an energy exchange between the modules or the energy storage elements thereof in the overall topology becomes possible. Since the MMC modules mentioned in the introduction only enable a serial and a bypass connection state between respective modules, the topology of the modules according to aspects of the invention affords a possibility for exchanging energy between the modules, in particular the modules of the different strings.

In a configuration, the individual modules have a first side and a second side, wherein the first side has two terminals and the second side has two terminals.

In accordance with one possible embodiment of the multi-level converter according to aspects of the invention, the individual modules of the first number of individual modules are electrically connected to one another in each case by means of two electrical conductors. Preferably, MMSPC modules are to be provided in this case as individual modules.

In this case, in a configuration, each or at least one of the at least two taps for respectively connecting a phase module branching off from the ring arrangement provides a respective terminal at the two electrical conductors.

In an alternative configuration, each or at least one of the at least two taps for connecting a phase module branching off from the ring arrangement provides a terminal at one of the two electrical conductors.

In yet another configuration, the two electrical conductors are combined at each or at least one of the at least two taps for connecting a phase module branching off from the ring arrangement.

With the provision of MMSPC modules which additionally allow a temporarily usable parallel connection state, it is possible to effect the energy exchange between the modules across the central ring and the strings or star strings via an occasionally parallel connection of the modules, as a result of which current flows from that module having higher voltage, e.g. on account of a higher state of charge of the embedded energy storage element, to that module having low voltage of the parallel-connected modules and thus brings about an energy exchange between the modules.

Alternatively, an energy exchange can also be effected via monitoring or control of an energy inflow and outflow of each individual module in the overall topology and correspondingly targeted selection of a module state of a respective module.

The invention proposes a topology having a central ring and, connected thereto, arms or star strings each formed from a number of modules. A respective number of modules in each partial string can be different. In this case, a partial string of modules is defined as a ring segment, i.e. a section of the ring between two terminals to which e.g. respectively, an arm of modules, i.e. a star string, is connected, or as a phase module branching off from the ring and forming a star string and comprising at least two modules. Furthermore, different module types can also be combined. By way of example, MMC modules can predominantly be used in the central ring, and MMSPC modules can predominantly be used in the arms or star strings.

In a three-phase system, i.e. with the provision of three phase terminals, an achievable voltage at the phase terminals at the respective ends of the arms or star strings for the case of modules of identical type, i.e. identical module types with symmetrical module interconnection, is given by:

$$V_{terminal} = \left(\frac{n_r}{\sqrt{3}} + n_s\right)\frac{V_m}{3}$$

wherein $n_r$ indicates the number of all modules in the ring, $n_s$ indicates the number of modules in the three arms or star strings together and $V_m$ indicates the module voltage of a respective module.

An optimum design, i.e. a selection of the number of modules in the central ring and the respective arms or star strings, constitutes an optimization problem. This optimization problem is subject to two aims, in particular, namely the smallest possible total number of modules and minimal losses. Such an optimization problem can be solved by numerical simulation.

One advantage of the present invention is that the entire charge exchange between modules within the overall system across strings or partial strings no longer need be effected solely via a parallel connection in a common star string with low voltage, i.e. module voltage, of the individual modules and thus high current. Instead, via the central ring it is possible to exchange charge and thus energy via a ring current flowing in the central ring at a comparatively high voltage level. Both in the arms or star strings and in the central ring energy can be exchanged between the modules via parallel connection and also via suitable open-loop and/or closed-loop control of a selection of the states of each individual module. In general, the central ring to be provided here comprises fewer modules than would be the case with a pure ring topology mentioned in the introduction, such that a path for a ring current is significantly shorter. With the same balancing ring current amplitude, the ring current in the central ring thus generates lower losses than is the case for a pure ring topology.

In accordance with a further configuration of the modular multi-level converter according to aspects of the invention, at least one additional tap is arranged between two adjacent individual modules of the ring, said at least one additional tap forming a phase terminal for directly connecting an electrical machine.

In yet another configuration, at least two individual modules of the ring are arranged between two adjacent taps of the ring, said at least two individual modules forming a ring segment.

In accordance with one possible embodiment of the multi-level converter according to aspects of the invention, the switching elements of the multiplicity of individual modules are low-voltage semiconductor switching elements, in particular MOSFETs.

Preferably, the at least two taps for respectively connecting a phase module or side string branching off from the ring arrangement symmetrically divide the ring of the individual modules, i.e. the ring segments formed as a result all comprise the same number of individual modules.

In a possible configuration, more than three star strings or arms can be connected to the central ring. In particular, e.g. six star strings can be connected to the central ring, wherein e.g. a ring segment defined by the connected star strings comprises only one module. In order to provide an e.g. six-phase system, the central ring comprises in particular only six modules, wherein each module defines a ring segment that is delimited by a connected star string on both sides. Accordingly, six star strings or arms are connected to the ring, said star strings or arms in turn respectively comprising a plurality of modules, e.g. four modules. Each star string comprises two terminals, of which in each case one is connected to the central ring and the other is available as a free terminal or phase terminal in order to connect an electrical machine thereto. If e.g. six terminals are made available by the topology, then this affords the possibility of supplying two electrical machines which are to be operated independently and which are to be operated respectively in three-phase fashion. By way of example, such a topology could be used for an electrical all-wheel drive with one machine for a front axle and one machine for a rear axle or one machine for a left wheel and one machine for a right wheel. By means of the topology provided according to aspects of the invention, this machine could be supplied via the six taps, wherein an energy exchange between the modules of different partial strings, which energy exchange constitutes a significant proportion of the electrical power of the corresponding drive machine, e.g. 20%, in particular >50%, can be achieved with tenable losses. In the simplest case, the connection of electrical machines, such as e.g. motors, can be effected at three adjacent terminals for a first machine and likewise at three adjacent terminals for a second machine. Such an arrangement allows comparatively simple closed-loop control and a maximum energy exchange between associated phases of the interconnected machines for compensation of current harmonics in the end modules on account of an alternating current load.

Alternatively, a manner of connection of the machines can be interlaced in one another by virtue of the fact that, in the above-described example of six phase terminals, the six terminals or phase terminals circumferentially in the ring are assigned e.g. alternately to one and the other machine. Some advantages are likewise afforded in this case. On account of the direct "electrical vicinity", a high power flow between modules of a string of one machine and those of the other machine is made possible, in order e.g. to compensate for a different loading of the machines in terms of traveling dynamics during acceleration, deceleration and cornering as a result of energy flow between the modules of different strings. Furthermore, in the case of synchronous operation of the electrical machines with an identical frequency and a suitable phase, a necessary voltage between the adjacent terminals or phase terminals is reduced, as a result of which the amplitude to be made available by the modules is reduced.

Instead of electrical machines, other loads or electrical networks can likewise be connected in order e.g. to enable energy conversion between the connected networks and to allow the multi-level converter having respectively suitable energy storage elements to act as a network store or compensation system, so-called STATCOM or UPFC. In this case, the connected networks need not have the same frequency or amplitude or synchronism. In this regard, it is possible to connect e.g. the railroad electrical network in Germany and various interconnected networks in North America or in Japan.

A higher number of connected machines with a correspondingly higher number of phases of the converter according to aspects of the invention is likewise possible.

Furthermore, the present invention proposes an electrical polyphase system comprising at least one electrical machine which has a multiplicity of windings having a first terminal and a second terminal, wherein at least one node exists to which either the first or the second terminal of a respective winding of the multiplicity of windings is electrically connected and the corresponding other terminal of the first and second terminals of a respective winding of the multiplicity of windings is electrically connected to a phase terminal, and an above-described modular multi-level converter according to aspects of the invention, wherein a number of phase terminals of the modular multi-level converter is equal to a number of windings of the at least one electrical machine, and wherein the individual modules of the modular multi-level converter respectively have an energy storage element and a plurality of switching elements, which plurality of switching elements enables interconnection of energy storage elements (312) of adjacent individual modules, as a result of which between two adjacent phase terminals or two adjacent windings a voltage difference is provideable, which is regulatable by a first control unit in accordance with a profile of a polyphase rotating field, and as a result of which between energy storage elements of individual modules of the plurality of individual modules a power exchange is realizable and is controllable by a second control unit.

In a possible configuration, the at least one electrical machine operates as a generator or as a motor.

Furthermore, a method for operating an electrical polyphase system is provided, wherein an electrical machine and a modular multi-level converter are used, wherein the electrical machine has a multiplicity of windings having a first terminal and a second terminal and either the first terminal or the second terminal of a respective winding of the multiplicity of windings is connected to a node to which each winding of the multiplicity of windings is connected, and the corresponding other terminal of the first and second terminals of a respective winding of the multiplicity of windings is connected to a phase terminal, and wherein the modular multi-level converter has a plurality of individual modules, wherein a first number of individual modules are interconnected in succession to form a closed ring, and at least two taps are arranged in each case between two adjacent individual modules of the ring, wherein at least one individual module of the ring is arranged between two adjacent taps, said at least one individual module forming a ring segment, and wherein at at least two taps respectively a second number of Individual modules are provided as phase module branching off from the ring arrangement and forming a star string and comprising at least two individual modules, said phase module being connected to the respective tap by one end and forming a phase terminal at the other end, to which the first or the second terminal of a winding of the multiplicity of windings of the electrical machine is electrically connected, wherein the individual modules of the modular multi-level converter respectively have an energy storage element and a plurality of switching elements, which plurality of switching elements enables Interconnection of energy storage elements of adjacent individual modules, as a result of which between two adjacent phase terminals or two adjacent windings a voltage difference is provided, which is regulated by a control unit in accordance with a profile of a polyphase rotating field, and as a result of which between energy storage elements of individual modules of the plurality of individual modules a power exchange is realizable and is controlled by a second control unit.

Further advantages and configurations of the invention are evident from the description and the accompanying drawings.

It goes without saying that the features mentioned above and those yet to be explained below can be used not only in the combination respectively indicated, but also in other combinations or by themselves, without departing from the scope of the present invention.

BRIEF DESCRIPTION OF THE DRAWING

The invention is illustrated schematically on the basis of embodiments in the drawing and is described schematically and thoroughly with reference to the drawing.

FIG. 6 shows various possible connections between ring arrangement and star string in a modular multi-level converter according to aspects of the invention.

The figures are described in an interrelated and all-encompassing manner; the same reference signs are assigned to identical components.

DETAILED DESCRIPTION OF THE INVENTION

Electric vehicles in the prior art use inverters for providing an AC voltage required for the operation of the electric motor, said inverters converting a DC voltage provided by a DC voltage source into the required AC voltage. A three-phase AC current is often required for electric motors, that is to say that the electric motor has three windings, wherein the profile of the respective voltages in the individual windings is phase-shifted by 120° if the windings are arranged at regular intervals on a circle.

The number of phases of an electrical machine is increased by the number of windings of the electrical machine being increased. Depending on how many phases the electrical machine is intended to have, the electrical machine has a corresponding number of windings. Each winding is thus assigned to one phase. The multiplicity of windings is intended generally to be distributed uniformly over a circumference of a circle, as a result of which a uniform phase angle is established between the profile of the voltages of the individual windings.

The windings can be interconnected with one another in various ways. One possibility is a so-called star connection. In a star connection, in each case one terminal of the individual windings are electrically connected to one another at a common node of all the windings, the so-called star point. If the windings are distributed regularly on the circle, the voltage at the star point is zero, as a result of which a neutral conductor is connectable to the star point. The corresponding other terminal of a winding is connected to a phase terminal and has a voltage that is increased relative to the star point.

Figure 1:
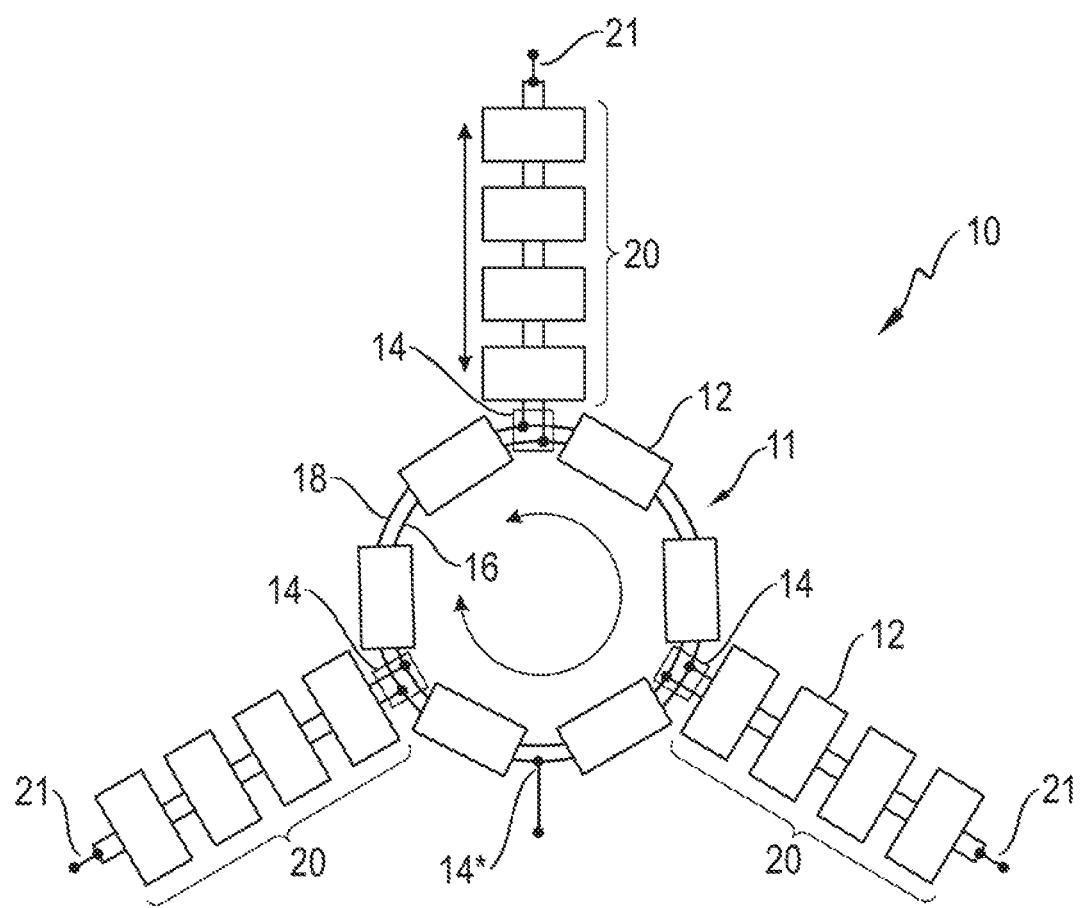
FIG. 1 shows a schematic view of one exemplary macrotopology of a modular multi-level converter according to aspects of the invention, which modular multi-level converter is to be used according to aspects of the invention.

The phase terminal is provided by a converter. FIG. 1 illustrates a schematic circuit diagram of a converter 10 according to aspects of the invention, a so-called modular multi-level converter 10. The modular multi-level converter 10 according to aspects of the invention has a multiplicity of individual modules 12. The individual modules 12 can themselves have an arbitrary topology, a so-called microtopology, which usually consists of a plurality of switching elements and respectively at least one electrical energy storage, for example a capacitor or a battery cell.

Figure 3A:
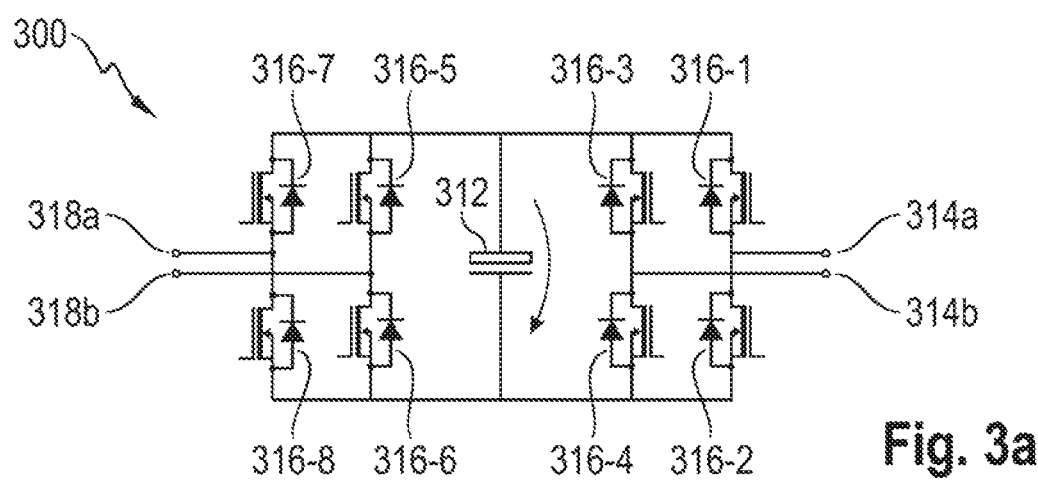
FIGS. 3a, 3b, and 3c show three respective embodiments of an exemplary individual module for use in a modular multi-level converter from FIG. 1 or FIG. 2.
Figure 3B:
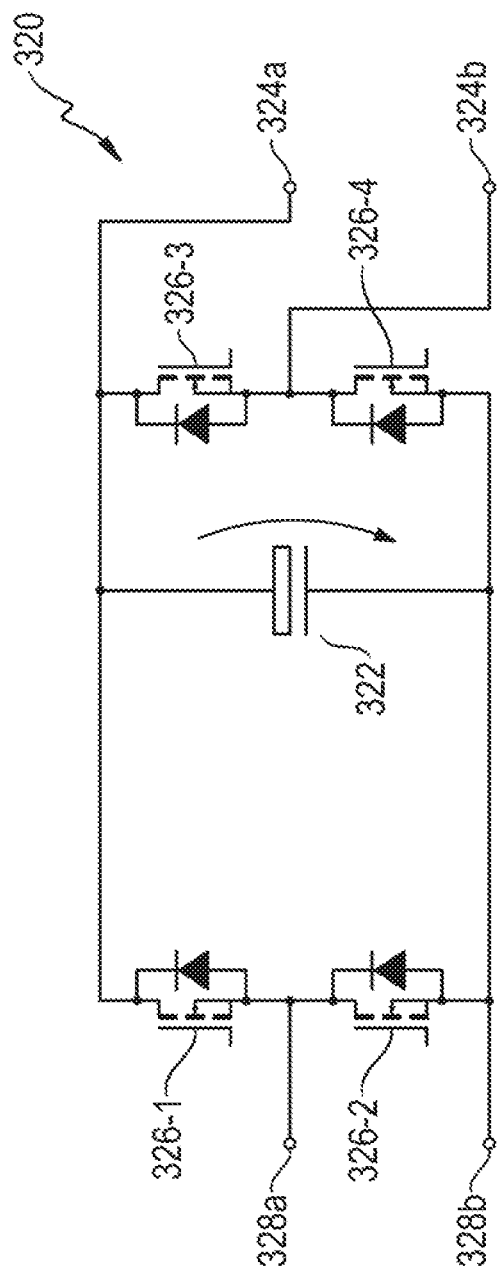
Figure 3C:
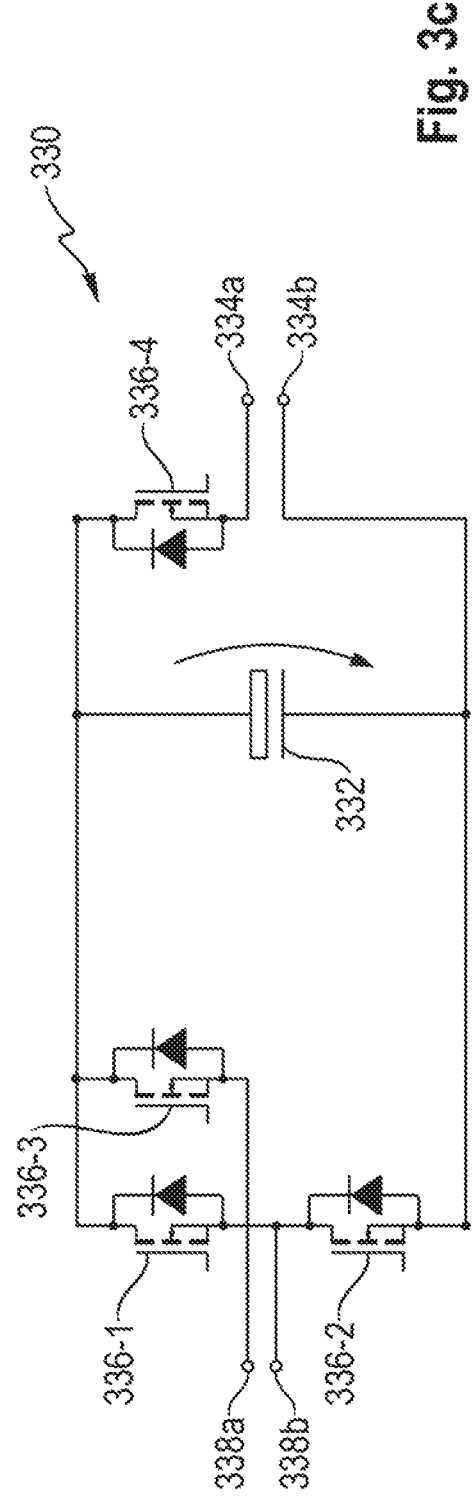

Exemplary individual modules 300, 320 and 330 are illustrated in FIGS. 3a, 3b and 3c, respectively.

The exemplary individual module 300 from FIG. 3a has two sides, each having two terminals. The terminals 314a and 314b are arranged on a first side. The terminals 318a and 318b are arranged on a second side. In the embodiment shown, the exemplary individual module 300 has eight switching elements 316-1, 316-2, 316-3, 316-4, 316-5, 316-6, 316-7, 316-8. Therefore, for an electrical connection of the terminals 314a, 314b to the terminals 318a, 318b, for each connection, that is to say 314a-318a, 314a-318b, 314b-318a and 314b-318b, in each case two load paths are available. That makes it possible to design the switching elements 316-1 to 316-8 for a lower current-carrying capacity. Consequently, low-voltage switching elements or low-voltage semiconductor switching elements can also be used for the switching elements because the maximum voltage for which the switching elements 316-1 to 316-8 have to be designed is significantly below the total voltage of the system, namely for example only at the maximum voltage of the electrical energy storage element 312 of an individual module 300 to which the switching elements 316-1 to 316-8 are assigned. The electrical energy storage element 312 can be a capacitor of any type or a single battery cell or a plurality of battery cells (for example a small battery pack). It should be understood that, by way of example, primary cells, secondary cells or energy sources and energy storage elements that only provide a DC voltage can be used as a battery.

The switching elements illustrated in FIG. 3a allow two parallel paths for almost all connections between the energy storage element 312 and a corresponding energy storage element of an adjacent individual module of identical type. The switching elements are correspondingly used in parallel. However, switching elements can be eliminated in order to reduce the complexity. However, the remaining switching elements should then be implemented with correspondingly larger semiconductors, if semiconductor switching elements are used, in order to enable the same current-carrying capacity. Through a corresponding selection of semiconductors, it is possible to optimize specific switching states with regard to their losses relative to other switching states.

In this regard, the switching elements 316-1 and 316-7 form a path which is in parallel with the path formed by the switching elements 316-2 and 316-8 and leads to the same target, i.e. to the terminal 314a or the terminal 318a depending on direction. The switching elements 316-6 and 316-4 form a path which leads to the same target as the path formed by the switching elements 316-5 and 316-3, namely to the terminal 314b or the terminal 318b depending on direction. The switching elements 316-1 and 316-5 form a path which leads to the same target as the path formed by the switching elements 316-2 and 316-6. Furthermore, the switching elements 316-4 and 316-8 form a path which is in parallel with the path formed by the switching elements 316-7 and 316-3 and leads to the same target, namely to the terminal 314b or 318a depending on direction.

In the case of an elimination, an arbitrary switching element can then be removed. However, a second switching element to be eliminated should be chosen such that a connection can still always be established from every terminal to every other terminal via the remaining switching elements. This results in a series of reduced circuits.

The exemplary individual module 320 from FIG. 3b likewise has two sides each having two terminals. The terminals 324a and 324b are arranged on a first side. The terminals 328a and 328b are arranged on a second side. In the embodiment shown, the exemplary individual module 320 has four switching elements 326-1, 326-2, 326-3 and 326-4. The switching elements 326-1 to 326-4 can nevertheless still be designed for a relatively low current-carrying capacity because the maximum voltage for which the switching elements 326-1 to 326-4 have to be designed is significantly below the total voltage of the system, namely for example only at the maximum voltage of the electrical energy storage element 322 of an individual module 320 to which the switching elements 326-1 to 326-4 are assigned. Consequently, low-voltage switching elements or low-voltage semiconductor switching elements can also be used for the switching elements. The electrical energy storage element 322 can be a capacitor of any type or a single battery cell or a plurality of battery cells (for example a small battery pack). It should be understood that, by way of example, primary cells, secondary cells or energy sources and energy storage elements that only provide a DC voltage can be used as a battery.

The switching elements illustrated in FIG. 3b allow a parallel connection between the energy storage element 322 and a corresponding energy storage element of an adjacent individual module of identical type. The switching elements are correspondingly used in parallel.

In this regard, the switching element 326-1 forms a path which leads to the terminal 324a or to the terminal 328a depending on direction. The switching elements 326-1 and 326-3 form a path which leads to the terminal 324b or to the terminal 328a depending on direction. The switching elements 326-2 and 326-1 form a path which leads to the terminal 328b or to the terminal 324a depending on direction. Furthermore, the switching elements 326-1 and 326-3 form a path which leads to the terminal 328a or 324b depending on direction.

The exemplary individual module 330 from FIG. 3c likewise has two sides each having two terminals. The terminals 334a and 334b are arranged on a first side. The terminals 338a and 338b are arranged on a second side. In the embodiment shown, the exemplary individual module 330 has four switching elements 336-1, 336-2, 336-3, 336-4. The electrical energy storage element 332 can be a capacitor of any type or a single battery cell or a plurality of battery cells (for example a small battery pack). It should be understood that, by way of example, primary cells, secondary cells or energy sources and energy storage elements that only provide a DC voltage can be used as a battery.

The switching elements Illustrated in FIG. 3c allow a parallel connection between the energy storage element 332 and a corresponding energy storage element of an adjacent individual module of identical type. The switching elements are correspondingly used in parallel.

The switching elements 336-1 and 336-4 form a path which leads to the terminal 334a or to the terminal 338b depending on direction. The switching element 336-2 forms a path which leads to the terminal 334b or to the terminal 338b depending on direction. The switching elements 336-3 and 336-4 form a path which leads to the terminal 334a or to the terminal 338a depending on direction.

Figure 4:
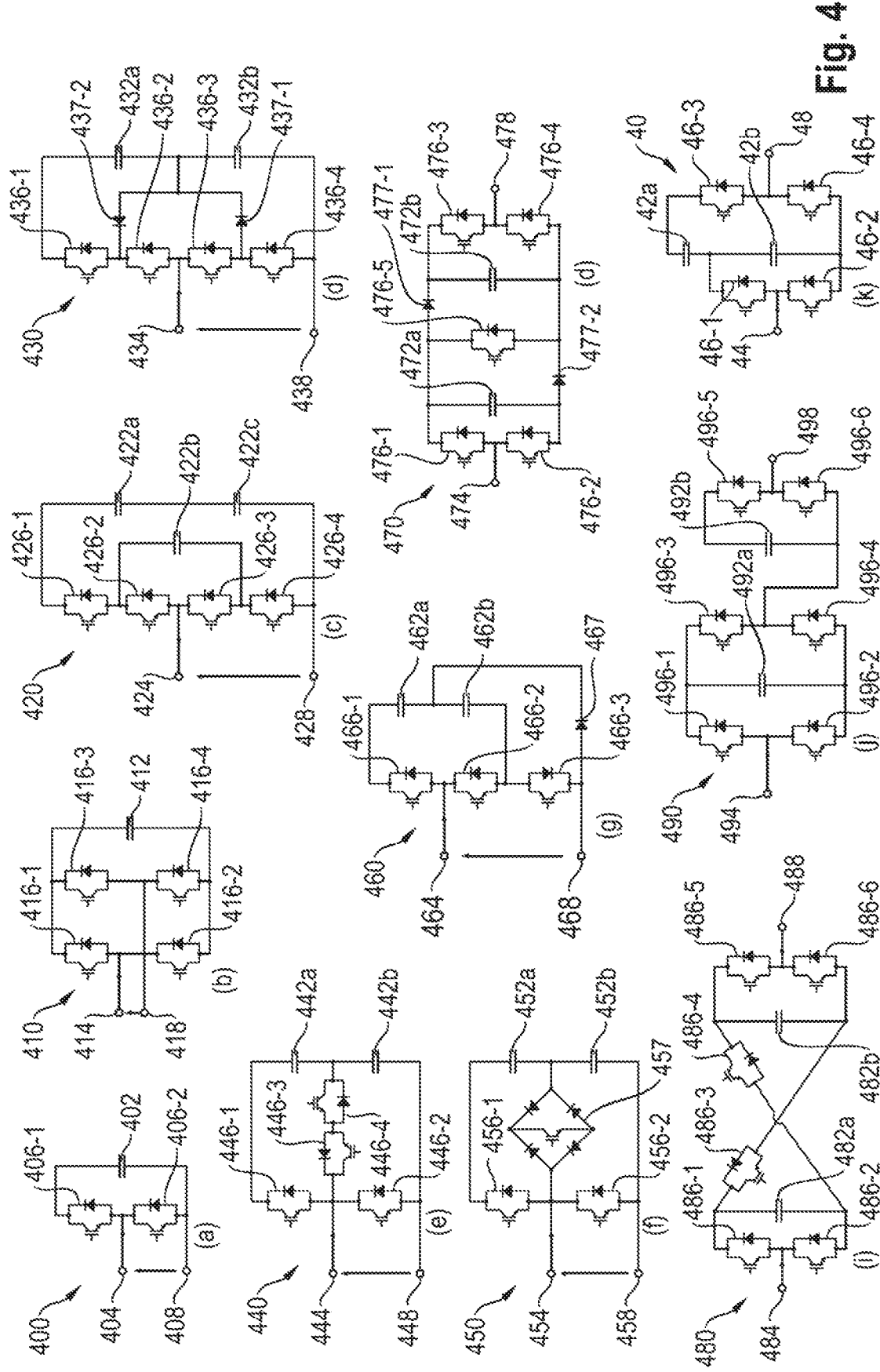
FIG. 4 shows further embodiments of an individual module for use in a further embodiment of a modular multi-level converter according to aspects of the invention.

FIG. 4 shows diverse module topologies or individual modules 400, 410, 420, 430, 440, 450, 460, 470, 480, 490, 40, that can be used in each case as an individual module 12. The individual modules 400, 410, 420, 430, 440, 450, 460, 470, 480, 490, 40 shown here, in contrast to the individual modules 300, 320, 330 shown in FIG. 3, do not allow parallel connection to a neighboring module coupled thereto.

The modules 400, 410, 420, 430, 440, 450, 460, 470, 480, 490, 40 all have in each case only two terminals 404, 408; 414, 418; 424, 428; 434, 438; 444, 448; 454, 458; 464, 468; 473, 478; 484, 488; 493, 498; 44, 48. The modules 400 and 410 each have one energy storage element 402 and 412, respectively; the modules 430, 440, 450, 460, 470, 480, 490 and 40 each have two energy storage elements 432a, 432b; 442a, 442b; 452a, 452b; 462a, 462b; 472a, 472b; 482a, 482b; 492a, 492b; 40a, 40b. The module 420 has three energy storage elements 422a, 422b and 422c. The modules 430, 460 and 470 also have individual diodes 437-1, 437-2; 467; 477-1, 477-2. The module 450 furthermore has a central switched rectifier module 457.

Figure 5:
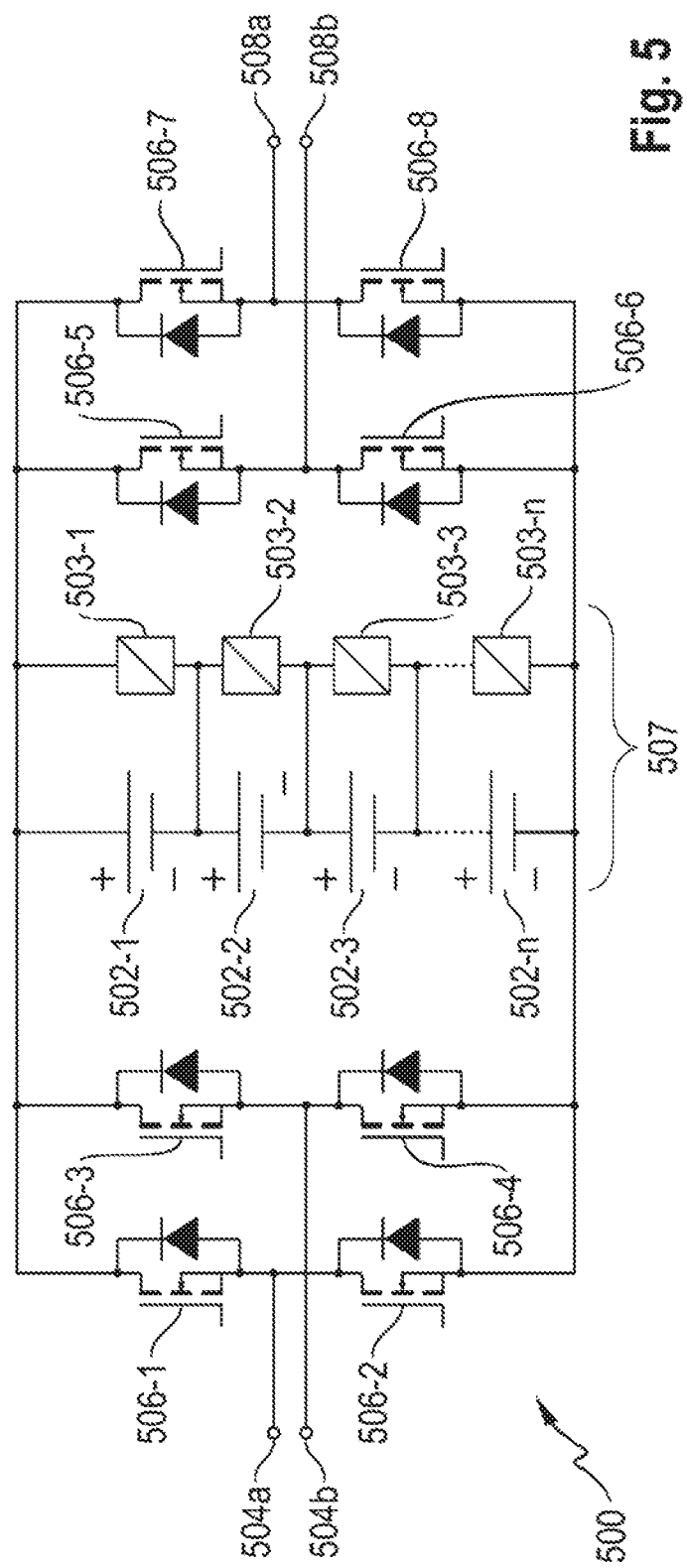
FIG. 5 shows yet another embodiment of an individual module for use in yet another embodiment of a modular multi-level converter according to aspects of the invention.

FIG. 5 shows an individual module 500 having four terminals 504a, 504b, 508a, 508b, eight switching elements 506-1, 506-2, 506-3, 506-4, 506-5, 506-6, 506-7, 506-8 and a battery management system 507. The possibilities for interconnection of the eight switching elements 506-1, 506-2, 506-3, 506-4, 506-5, 506-6, 506-7, 506-8 are identical to those for the individual module 300 from FIG. 3a. Therefore, for an electrical connection of the terminals 504a, 504b to the terminals 508a, 508b, for each connection, that is to say 504a-508a, 504a-508b, 504b-508a and 504b-508b, in each case two load paths are available. Battery cells or double layer capacitors can be chosen as energy storage elements 502-1, 502-2, 502-3, . . . , 502-n, which are assigned a resistor 503-1, 503-2, 503-3, . . . , 503-n respectively connected in parallel. In the case of a series connection of such energy storage elements, it is advantageous to have a battery management 507 in a form such that individual cells can be discharged largely independently of the other cells, which can be effected for example by resistors 503-1, 503-2, 503-3, . . . , 503-n shown here or via controllable discharge paths. By means of the battery management system 507, the individual cells 502-1, 502-2, 502-3, . . . , 502-n can be individually discharged if a corresponding individual cell is more highly charged than other individual cells.

It should be understood that for the modular multi-level converter 10 not just the exemplary individual modules 300, 320, 330, 400, 410, 420, 430, 440, 450, 460, 470, 480, 490, 40, 500 shown can be used as individual module 12, rather the individual modules 12 can have any arbitrary known topology from the prior art.

With such a modular multi-level converter 10 equipped with individual modules 12, hitherto hardwired battery packs can be separated into individual parts or individual modules 12 such that an electrical interconnection of the individual parts 12, that is to say of the energy storage elements of adjacent individual modules, can be varied dynamically during operation. The energy storage elements of adjacent individual modules can switch over between a parallel connection, a series connection, a bridging connection and a shutdown of individual or a plurality of individual modules. That makes it possible that via a charge exchange between the individual modules or energy storage elements, by way of example, a conventional battery management can be implemented in order to load the energy storage elements uniformly. Furthermore, defective individual modules 12 can be bridged, without the overall function being lost. In particular, it is possible to generate arbitrary output voltages and temporal current and/or voltage profiles at the terminals, e.g. 314a, 314b, 318a, 318b in the case of FIG. 3a, directly by means of the individual modules, without the need for an additional power electronic converter.

As evident in FIG. 1, the individual modules 12, via their terminals, such as, for example, the terminals 314a, 314b, 318a, 318b of the individual module 300 from FIG. 3a, are electrically connected to an adjacent individual module 12 via two electrical conductors 16 and 18. According to aspects of the invention, a first number of individual modules 12 are arranged in a circle or ring, such that an n-th individual module 12 is electrically connected to a first individual module 12. In order to be able to tap off the current and/or voltage profiles generated by the individual modules 12, here three taps 14 are arranged between two adjacent individual modules 12, to which taps in each case a phase module 20 branching off from the ring arrangement is connected, wherein each phase module 20 comprises here four individual modules 12 and wherein the end 21 of the phase module 20 facing away from the ring forms a respective phase terminal 21 for connecting a phase of an electrical machine. In the example shown here, the taps 14 are distributed uniformly over the ring and constitute three phase terminals 21 via respective phase modules or star strings 20 branching off from the ring arrangement. Each of the phase modules 20 here comprises four individual modules 12 forming a respective star string. Here respectively two individual modules 12 forming a phase module or a ring segment are arranged between two adjacent taps 14. Generally, the star strings 20 and the ring segments can comprise an arbitrary and mutually different numbers of individual modules 12. Furthermore, the individual modules 12 in the ring segments and in the star strings 20 can be of different types. By way of example, the individual modules 12 in the ring segments can be predominantly MMC modules and those in the star strings can be predominantly MMSPC modules. Furthermore, the individual modules 12 also within a star string 20 and/or within the ring arrangement 11 can be of different types. Depending on the configuration of the individual modules 12, the connections between the individual modules 12 and to the taps 14 for respectively connecting a star string 20 can be defined differently, which is identified here by a respective framing of the taps 14, i.e. separately via two or merely via one electrical conductor 16, 18 or via a combination of two conductors 16, 18. Firstly, FIG. 1 illustrates three taps 14 of this type. By simply adding an additional tap 14*, it is possible to provide an additional phase terminal formed directly at the ring arrangement 11. Such a converter or modular multi-level converter 10 having individual modules 12 arranged in a circle or ring can then be equipped in a simple manner with as many phase terminals 21 as desired, which are provideable in particular via respective star strings 20 (depending on how many individual modules 12 are present, the number of which can, however, also be increased arbitrarily). The taps 14 can be realized in various ways. By way of example, both electrical conductors 16, 18 for connecting correspondingly two conductors of an individual module 12 of a star string 20 can be available at a tap 14. Furthermore, the two electrical conductors 16, 18 could be combined at the tap 14. However, this means that a parallel connection of adjacent energy storage elements of the individual modules is not possible. Alternatively, a tap 14 could be realized which provides a terminal only at one electrical conductor 16 or 18, respectively, as is illustrated for the additional tap 14*. This means, however that the current loading for the switching elements that operate the respective electrical line is higher. Between two taps 14, the corresponding individual modules form a ring segment.

By virtue of such an arrangement of the individual modules 12 in the modular multi-level converter 10, by means of the dynamic reconfiguration it is possible to generate directly the AC voltage and the multiphase voltage for one or more consumers, such as, for example, an electrical machine operating as a motor. In contrast to converters in the prior art, a modulation index, i.e. a characteristic value of a corresponding frequency modulation, can be kept at a maximum at all amplitudes. Furthermore, the losses even decrease at low voltages because an effective internal resistance decreases as a result of a parallel connection of battery parts (that is to say of the respective energy storage elements) of a switched battery. Furthermore, a switched battery in which the energy storage elements can be switched back and forth between a parallel connection and a series connection generates an output voltage that is almost free of distortion since steps between the voltages of two configurations can be kept very small. Moreover, modulation can be effected by switching modulation between such voltages in order to provide further smoothing.

By means of the macrotopology according to aspects of the invention of the individual modules 12 interconnected with one another, a simple and efficient power balancing between the energy storage elements of the plurality of individual modules 12, whether they are part of a star string 20 or part of a ring segment, is additionally realizable and controllable.

According to aspects of the invention, with the polyphase system according to aspects of the invention the number of phases can be increased in a simple manner. In this case, the windings of the electrical machine are interconnected as a so-called star connection and the modular multi-level converter 10 is operated as an n-gon circuit or ring circuit having a number of star strings 20 branching off from the ring circuit, which number corresponds to the number of phases. One terminal of the windings of the electrical machine here is in each case electrically connected to a phase terminal 21 of the multi-level converter 10.

With the polyphase system according to aspects of the invention in particular through the use of a modular multi-level converter 10 having a macrotopology according to aspects of the invention of individual modules 12, it is now possible directly to represent and provide the voltage difference between two adjacent phase sections or windings of one or more electrical machines. If the number of phases is increased, the voltage at the windings of the respective electrical machine remains constant, but the phase voltage provideable by the converter decreases linearly. In conventional power electronic circuits, this relationship was irrelevant since inverters in the prior art always generate the respective phase voltages with respect to a reference potential, for example the terminals of a link capacitor, and cannot form voltage differences between two windings. However, the voltage differences can be generated directly by the modular multi-level converter 10. By using an n-phase system, that is to say a system having a high (greater than 3) number of phases (in particular in the electrical machine), in which load (electrical machine) and source (modular multi-level converter) are interconnected differently (electrical machine in star connection, modular multi-level converter in n-arm angular or ring connection), it is possible to generate the additional phases with low voltage. The very low voltage can be generated with a small number of individual modules 12 in a phase module 20. In general, a phase module 20 has at least two individual modules 12.

If the modular multi-level converter 10 has three phase terminals 21, for example, the converter operates in a known delta connection. The outlay for adding a further phase consists merely in adding an additional tap 14 and a star string 20 branching off therefrom. In this case, the current loading of the individual modules 12 remains constant to a first approximation given identical drive power. At the same time, however, the average current intensity per phase of the electrical machine decreases inversely linearly with the number of phases. Since the voltage difference between the windings is now provided directly by the converter 10, the voltage at the winding is now no longer related to the star point, but rather to an adjacent winding. The star point is thus a degree of freedom in a control algorithm and can be implemented as a constraint in the control algorithm of the converter.

As a result of the number of phases being increased, the phase voltage in the converter is reduced, as mentioned.

Figure 2:
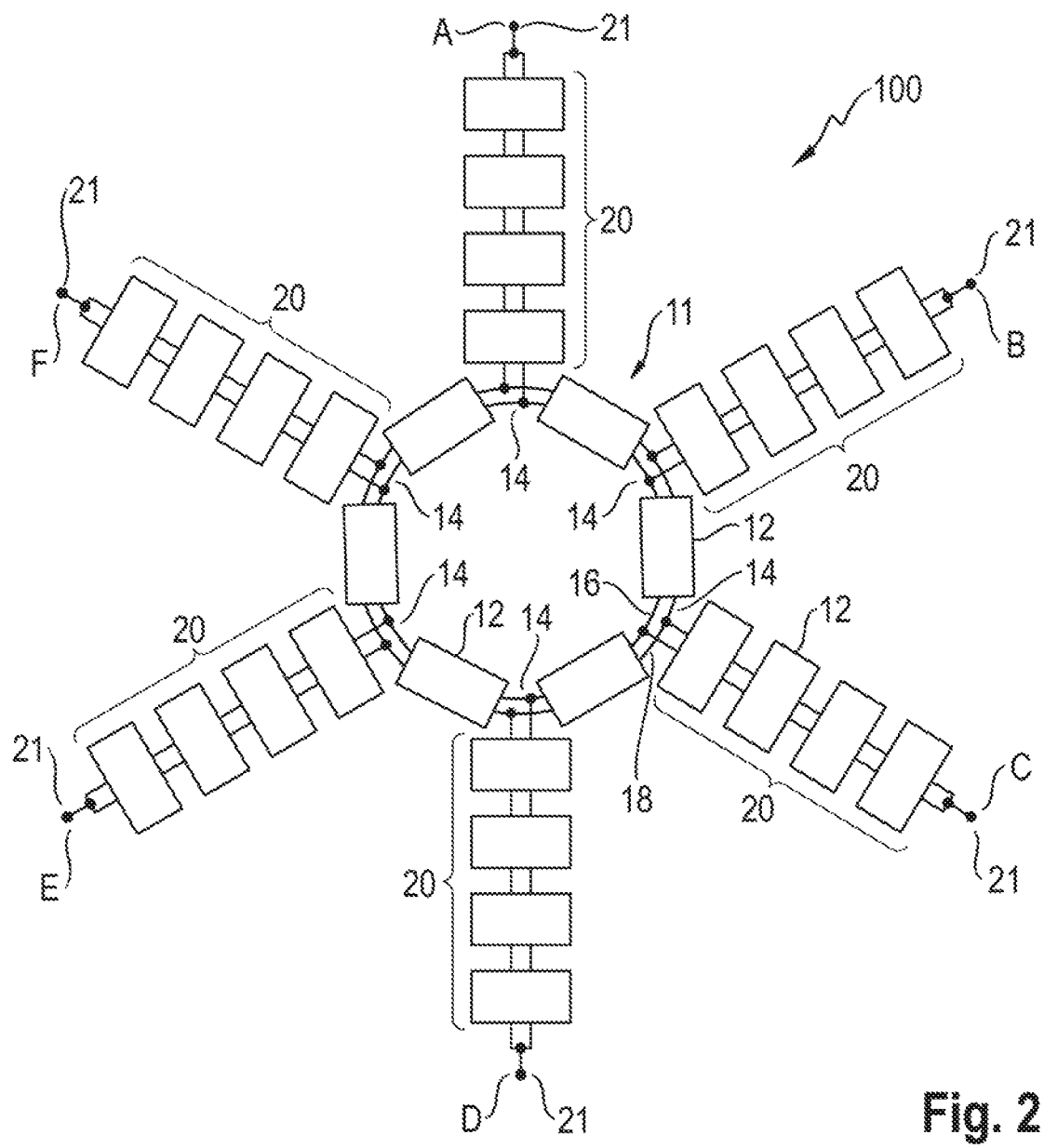
FIG. 2 shows a schematic view of a further exemplary macrotopology of a modular multi-level converter according to aspects of the invention, which modular multi-level converter is to be used according to aspects of the invention.

FIG. 2 shows a further embodiment of a modular multi-level converter 100 for use in a polyphase system according to aspects of the invention. In this case, the modular multi-level converter 100 has three additional phase modules 20. The additional phase modules 20 each have at least two, here four, individual modules 12. The additional phase modules 20 are respectively connected to a tap 14.

Moreover, the embodiment of the modular multi-level converter 100 as shown in FIG. 2 has a plurality of individual modules 12 interconnected with one another to form a ring 11. In this case, the individual modules 12 are connected to one another via two electrical conductors 16, 18. Taps 14 are arranged between respectively two adjacent Individual modules 12. In this case, both electrical conductors 16, 18 can be combined in order to form a terminal. Alternatively, a terminal is arranged only at one electrical conductor 16, 18. Alternatively a respective star string 20 is connected via two electrical conductors to the two electrical conductors 16, 18 as illustrated here.

There are two preferred mechanisms for an energy exchange within the multi-level converter 10, 100 according to aspects of the invention. They are, firstly, as indicated by a curved arrow within the ring arrangement 11, ring currents in the ring arrangement 11, and, secondly, as indicated for example by an arrow at a star string 20, a parallel connection in the star string 20 and from the ring arrangement 11 to a respective star string 20. Parallel connection in the star string 20 and/or from ring arrangement 11 to star string 20 enables charge balancing between the modules 12 comprised thereby. The ring currents in the ring arrangement 11 likewise enable charge balancing between the modules 12 comprised by the ring arrangement 11. Although the mechanisms can also be used oppositely, i.e. in the respective other regions, nevertheless the abovementioned use of the mechanisms is advantageous.

FIG. 6 shows various possibilities for connection between ring arrangement 11 and individual star string 20 of a multi-level converter according to aspects of the invention at tap or star point 14. Connection 601 generally represents a connection or linkage of a star string 20 to the ring arrangement 11 and stands as a placeholder for specifically configured linkages 602, 603, 604, 605, 607, 609. At the linkage points 602, 603 and 604, in each case two modules of the ring arrangement 11 are connected to a module of a star string 20. The linkage points 605, 607 and 609 in each case likewise allow a connection between two modules of the ring arrangement 11 and a module of a star string 20. Furthermore, they in each case allow, via separately provided terminals 606, 608 and 610 a linkage of a further module and/or of a consumer, independently of a connection between ring arrangement 11 and star string 20. The linkage possibilities 602 and 605 are particularly advantageous since they each allow an occasional parallel interconnection across the star point 14 with the use of MMSPC modules as individual modules.

What is claimed is:

1. A modular multi-level converter comprising:
   a plurality of individual modules, each individual module having a plurality of switching elements and at least one electrical energy storage element, wherein a first number of the plurality of individual modules are interconnected in succession to form a closed ring, and
   at least two taps arranged between respective adjacent individual modules of the closed ring, and
   at each of the respective taps, a second number of the plurality of individual modules are provided as a respective phase module branching off from the closed ring and forming a star string, the second number of individual modules comprising at least two individual modules, said respective phase module being connected to the respective tap on one end and forming a phase terminal at an other end,
   wherein the plurality of switching elements enables interconnection of energy storage elements of adjacent individual modules, as a result of which between two adjacent phase terminals a voltage difference is provideable, which is regulatable by a control unit in accordance with a profile of a polyphase rotating field, and as a result of which between energy storage elements of individual modules of the plurality of individual modules a power exchange is realizable and is controllable by a second control unit.

2. The modular multi-level converter as claimed in claim 1, wherein a plurality of the individual modules have a first side and a second side, wherein the first side has two terminals and the second side has two terminals.

3. The modular multi-level converter as claimed in claim 2, wherein the first number of individual modules are electrically connected to one another in each case by two electrical conductors.

4. The modular multi-level converter as claimed in claim 3, wherein each or at least one of the at least two taps for respectively connecting a phase module branching off from the closed ring provides a respective terminal at the two electrical conductors.

5. The modular multi-level converter as claimed in claim 3, wherein each or at least one of the at least two taps or connecting a phase module branching off from the closed ring provides a terminal at one of the two electrical conductors.

6. The modular multi-level converter as claimed in claim 1, wherein at least one additional tap is arranged between two adjacent individual modules of the closed ring, said at least one additional tap forming a phase terminal for directly connecting an electrical load or an electrical network to the closed ring.

7. The modular multi-level converter as claimed in claim 1, wherein at least two individual modules of the closed ring are arranged between two adjacent taps of the closed ring, said at least two individual modules forming a phase module.

8. The modular multi-level converter as claimed in claim 1, wherein at least one portion of the switching elements of the plurality of individual modules are low-voltage semiconductor switching elements.

9. The modular multi-level converter as claimed in claim 1, wherein the respective taps for respectively connecting a phase module branching off from the closed ring symmetrically divide the closed ring of the individual modules.

10. The modular multi-level converter as claimed in claim 1, wherein the first number of individual modules consists of modular multilevel converter (MMC) modules and the respective second number of individual modules consists of modular multilevel converter with serial and parallel connectivity (MMSPC) modules.

11. An electrical polyphase system comprising
at least one electrical machine which has a multiplicity of windings each having a first terminal and a second terminal, and has at least one node to which either the first or the second terminal of a respective winding of the multiplicity of windings is electrically connected and a corresponding other terminal of the first and the second terminals of a respective winding of the multiplicity of windings is electrically connected to a phase terminal, and
a modular multi-level converter as claimed in claim 1, wherein a number of phase terminals of the modular multi-level converter is equal to a number of windings of the at least one electrical machine, and
energy storage element.

12. A method for operating an electrical polyphase system, wherein an electrical machine and a modular multi-level converter are used, wherein the electrical machine has a multiplicity of windings each having a first terminal and a second terminal and either the first terminal or the second terminal of a respective winding of the multiplicity of windings is connected to a node to which each winding of the multiplicity of windings is connected, and the corresponding other terminal of the first and second terminals of a respective winding of the multiplicity of windings is connected to a phase terminal of the modular multi-level converter, and wherein the modular multi-level converter has a plurality of individual modules, wherein a first number of individual modules are interconnected in succession to form a closed ring, and at least two taps are arranged between respective adjacent individual modules of the closed ring, and wherein at the at least two taps respectively a second number of individual modules are provided as phase module branching off from the closed ring and forming a star string, the second number comprising at least two individual modules, said phase module being connected to the respective tap by one end and forming a phase terminal at the other end, to which the first or the second terminal of a winding of the multiplicity of windings of the electrical machine is electrically connected, wherein the plurality of individual modules of the modular multi-level converter respectively have an energy storage element and a plurality of switching elements, which plurality of switching elements enables interconnection of energy storage elements of adjacent individual modules, as a result of which between two adjacent phase terminals or two adjacent windings a voltage difference is provided, which is regulated by a control unit in accordance with a profile of a polyphase rotating field, and as a result of which between energy storage elements of the plurality of individual modules of the plurality of individual modules a power exchange is realizable and is controlled by a second control unit.

13. The method as claimed in claim 12, wherein individual modules having a first side and a second side are used as individual modules, wherein the first side has two terminals and the second side has two terminals.

14. The method as claimed in claim 13, wherein the plurality of individual modules are electrically connected to one another in each case by two electrical conductors.

15. The method as claimed in claim 14, wherein at each or at least one of the at least two taps for connecting a phase module branching off from the closed ring a terminal is arranged at one of the two electrical conductors.

16. The method as claimed in claim 14, wherein at each or at least one of the at least two taps for respectively connecting a phase module branching off from the closed ring a respective terminal is arranged at both electrical conductors.

17. The method as claimed in claim 12, wherein low-voltage semiconductor switching elements are used for at least one portion of the switching elements of the plurality of individual modules.

\* \* \* \* \*